United States Patent
Bosshart

Patent Number: 5,440,717
Date of Patent: Aug. 8, 1995

[54] COMPUTER PIPELINE INCLUDING DUAL-PORTED, CONTENT-ADDRESSABLE WRITEBUFFER

[76] Inventor: Patrick W. Bosshart, 12537 Montego Plaza, Dallas, Tex. 75230

[21] Appl. No.: 194,136

[22] Filed: Feb. 9, 1994

Related U.S. Application Data

[63] Continuation of Ser. No. 841,896, Feb. 25, 1992, abandoned, which is a continuation of Ser. No. 456,187, Dec. 15, 1989, abandoned, which is a continuation of Ser. No. 761,221, Jul. 31, 1985, abandoned.

[51] Int. Cl.$^6$ .................. G06F 12/00; G06F 12/16; G06F 9/30; G06F 13/00
[52] U.S. Cl. .................. 395/486; 395/250; 395/375; 395/775; 395/800; 395/496
[58] Field of Search .......... 395/400, 375, 250, 425

[56] References Cited

U.S. PATENT DOCUMENTS

| | | | |
|---|---|---|---|
| 3,949,379 | 4/1976 | Ball | 395/775 |
| 4,025,771 | 5/1977 | Lynch, Jr. et al. | 395/375 |
| 4,107,773 | 8/1978 | Gilbreath et al. | 395/775 |
| 4,179,734 | 12/1979 | O'Leary | 395/775 |
| 4,208,716 | 6/1980 | Porter et al. | 395/425 |
| 4,217,640 | 8/1980 | Porter et al. | 395/575 |
| 4,245,304 | 1/1981 | Porter et al. | 395/425 |
| 4,333,143 | 6/1982 | Calder | 395/275 |
| 4,345,309 | 8/1992 | Arulpragasam et al. | 395/425 |
| 4,354,232 | 10/1982 | Ryan | 395/425 |
| 4,433,394 | 2/1984 | Torii et al. | 365/221 |
| 4,447,873 | 5/1984 | Price et al. | 395/250 |
| 4,467,414 | 8/1984 | Akagi et al. | 395/250 |
| 4,494,190 | 1/1985 | Peters | 395/250 X |
| 4,532,589 | 7/1985 | Shintani et al. | 395/375 |
| 4,539,067 | 9/1985 | Porter et al. | 395/800 |
| 4,561,051 | 12/1985 | Rodman et al. | 395/425 |
| 4,589,067 | 5/1986 | Porter et al. | 395/800 |
| 4,594,660 | 6/1986 | Guenthner et al. | 395/250 |
| 4,613,935 | 9/1986 | Couleur | 395/375 |
| 4,636,946 | 1/1987 | Hartung et al. | 395/250 |
| 4,750,154 | 6/1993 | Lefsky et al. | 365/189.04 |
| 4,761,731 | 8/1988 | Webb | 395/425 |
| 4,800,490 | 1/1989 | Tanaka et al. | 395/250 |
| 4,855,904 | 8/1989 | Daberkow et al. | 395/375 |
| 4,858,111 | 8/1989 | Steps | 395/425 |
| 4,884,197 | 11/1989 | Sachs et al. | 395/425 |

*Primary Examiner*—Jack B. Harvey
*Assistant Examiner*—Michael A. Whitfield

[57] ABSTRACT

A high performance computer pipeline allows reading or writing of data during a single clock cycle. A write queue is provided for temporary buffering of data to be written back to memory. Data is transferred from the write queue to memory during otherwise unused memory access cycles.

9 Claims, 2 Drawing Sheets

Fig. 1 (PRIOR ART)
Fig. 2

COMPUTER PIPELINE INCLUDING DUAL-PORTED, CONTENT-ADDRESSABLE WRITEBUFFER

This application is a Continuation of application Ser. No. 07/841,896, filed Feb. 25,1992; which is a Continuation of Ser. No. 07/456,187, filed Dec. 15, 1989, which is a Continuation of Ser. No. 06/761,221, field on Jul. 31, 1985; all abandoned.

BACKGROUND AND SUMMARY OF THE INVENTION

The present invention relates generally to computer systems, and more specifically to a high performance pipeline employing a write queue to improve processor throughput.

A multiple-address per instruction computer is one that accesses more than one memory location during the execution of a single machine instruction. A single-address instruction accesses only one memory location during execution. A read from and write to the same physical or logical address counts as two memory accesses. Thus, a single-address instruction can read from or write to a memory location, but not both. A two-address instruction can, for example, read from a memory location, increment the value, and write the new value back to the same address. A three-address instruction can, for example, read the values in two memory locations, add them, and write the results into a third memory location. Both memory reads can be accomplished at the same time by using a dual-port memory. However, reads and writes cannot be done simultaneously. Such multiple-address instructions are common in many computer architectures, including LISP machines such as the CADR and Texas Instruments Explorer (TM).

The pipelines presently in use are typified by the CADR pipeline illustrated in FIG. 1. This is a basic two-deep control pipeline with a third stage consisting of an invisible write. The control pipeline consists of the first two stages, shown as, for example, clock (CK) cycles one and two for the first instruction (I1).

The data pipeline consists of stages two and three. After the instruction has been fetched (in the previous cycle), the memory location, or two memory locations if a dual port memory is used with a three-address instruction, are read in during the first half of the second stage. The instruction is executed (EXE) during the second half of the second stage, with the result written to memory during the second half of the third stage. Since the memory write operation cannot take place during the memory read of the following instruction, the data to be written must be temporarily held in a latch and written to memory during the execution half-cycle of the following instruction.

FIG. 1 shows the complete execution of four multiple-address instructions, I1-I4, showing the instruction overlap as it moves through the pipeline. I1 is fetched from the instruction memory during the first clock cycle, with memory reads and instruction execution taking place during the second cycle. I2 is fetched during the second cycle, with the read and execute portions of I2 occurring during clock cycle 3. The I1 write takes place during the execution portion of I2, which occurs in the second half of the third clock cycle. A similar relationship between the instructions occurs with instructions I3 and I4. It is apparent from a review of FIG. 1 that the instruction memory need only be accessed once per cycle, while the data memory must be read from and written to during a single cycle. The ALU of the computer, which operates only during the EXE portion of each instruction, must operate in one half of a clock cycle, and is idle the other half. As can be seen from FIG. 1, the length of time that it takes to execute an instruction, or a microinstruction in the case of a microcoded machine, is at least the sum of the times required for a memory read and an ALU operation.

It will be apparent that there are several idle periods during the processing of a single instruction. Assuming that the instruction memory is the same speed as the data memory, an instruction fetch can be accomplished in approximately one-half of a clock cycle. The data memory is generally fully occupied, as reads are performed in the first half of each clock cycle, with writes being performed in the second half. However, the ALU is idle 50% of the time, inasmuch as it is only used in the EXE portion of the instruction.

It would be desirable for an instruction pipeline to utilize the ALU fully, in order to increase processor throughput. Since all processor activities can be performed individually within one-half clock cycle, 100% ALU utilization would allow the clock frequency to be doubled, thereby doubling the instruction execution rate of the machine.

Therefore, in order to provide a system which more nearly fully utilizes the various portions of the system, and provides increased throughput, a computer system comprises an instruction pipeline having separate fetch, memory read, instruction execute, and memory write stages. A write queue having multiple locations is provided, and the results of multiple-address instructions are written to the queue. When the data memory is not utilized by the read stage of a following instruction, a value stored in the queue is written to memory. Memory read addresses are compared to the addresses of numbers stored in the write queue so that the most recent value, which is stored in the write queue, will be read by the system.

The novel features which characterize the present invention are defined by the appended claims. The foregoing and other objects and advantages of the invention will hereinafter appear, and for purposes of illustration, but not limitation, preferred embodiment is shown in the drawings.

BRIEF DESCRIPTION OF THE DRAWING

FIG. 1 is a timing diagram showing an instruction pipeline as used in the prior art;

FIG. 2 is a timing diagram showing an instruction pipeline according to the present invention;

DESCRIPTION OF THE PREFERRED EMBODIMENTS

An instruction pipeline which allows 100% ALU utilization is shown in FIG. 2. In this pipeline, the instruction fetch (FETCH), data read (READ), instruction execute (EXE), and data write (WRITE) stages of an instruction can each be executed within one clock cycle. FIG. 2 shows the pipelined execution of four instructions, I1, I2, I3 and I4 during 7 clock (CK), cycles. The READ stage of I4, which occurs during cycle 5, is shown in parentheses to indicate that I4 does not read from memory.

It will be apparent that there is a conflict between the READ and WRITE STAGES of different instructions. For example, I1 must WRITE during the fourth clock cycle, and I3 must READ during this cycle. This would normally be possible only if the clock cycle were long enough to allow both a READ and WRITE instruction to occur. However, it is intention of the present invention to allow the clock cycle to be operated at an increased rate, which would leave time for only a single READ or WRITE operation during one clock cycle.

The pipeline shown in FIG. 2 is useful in machines which have a single-address instruction set, in which a single instruction can READ or WRITE but not both. In a single-address instruction machine, collisions in the data memory are avoided by writing to a register. If a following instruction performs a READ, then the value remains in the register. If a following instruction performs a WRITE, then, by definition, it cannot have performed a READ, and the value in the register is written to memory during the unused READ stage of such following instruction. This frees up the register to be written into by the following instruction.

Such a pipeline does not work for multiple-address instruction machines as described above, because many instructions can perform both READS and WRITES. In a one-address instruction architecture, the average bandwidth required of the memory is at most one access per instruction. The timing of that access may vary, thus requiring a write register. However, in a multiple-address instruction set the memory bandwidth is doubled, ie, a read and a write access may be required by each instruction. Using prior architectures, it is not possible to create a pipeline in which only one access time is allowed per instruction for both the READ and WRITE references.

Figure 3:
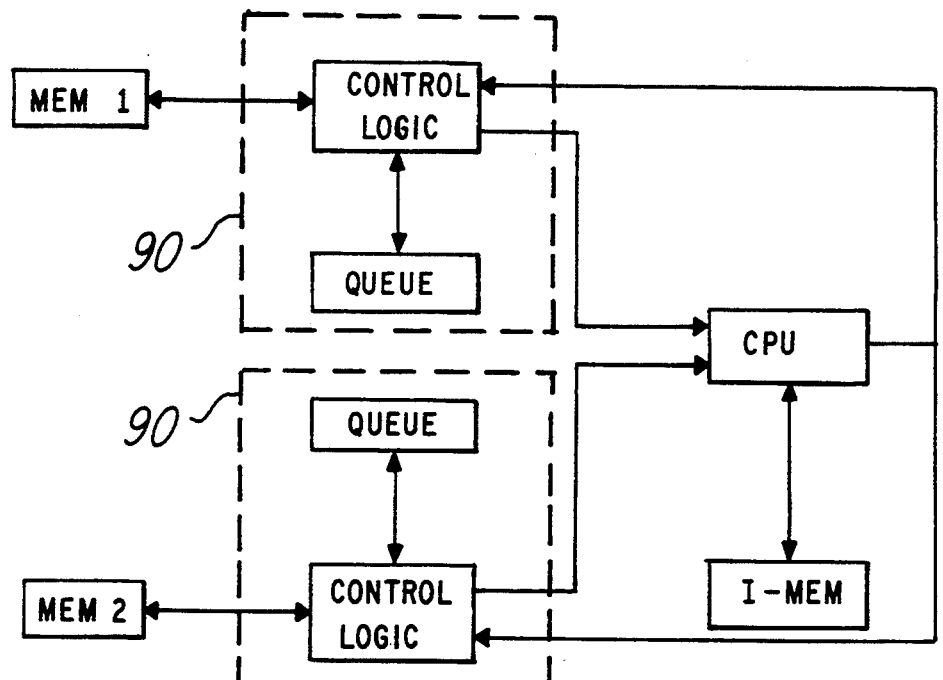
FIG. 3 is a block diagram of a portion of a computer system according to the present invention.

According to the present invention, a write queue is inserted between the central processor (CPU) and each data memory. Such a system is shown in FIG. 3, where an instruction memory, I-MEM, is coupled directly to the CPU, and typically contains microcode. First and second data memories (MEM1 and MEM2) holds data, temporary values, and so forth. MEM1 and MEM2 are coupled to the CPU through a write QUEUE and associated CONTROL LOGIC, collectively referred to as 90. If additional memories are used, each such memory has its own associated write QUEUE/CONTROL LOGIC 90. The CONTROL LOGIC 90 diverts CPU writes to the QUEUE, and causes memory reads to come from the associated MEM or the QUEUE, whichever is appropriate, as described below. A write queue allows the use of the pipeline shown in FIG. 2 because the actual execution statistics of machine instructions give an overall memory access bandwidth of less than one. Although some instructions both read and write in a single instruction, others do one or the other, while some instructions do neither. With several memories, some may have no operations in any given instruction. With the buffering effect provided by a write queue, values can be held to await time slots when the memory is otherwise free.

For example, referring to FIG. 2, the data memory is occupied with instruction READS during clock cycles 2, 3 and 4. Since I4 does not have a READ, a time slot is freed, allowing a value to be written back to memory from the write queue. The value written out would be the the value written into the write queue by I1 during the fourth clock cycle. Thus, during the fifth clock cycle, the value written into the write queue during the fourth clock cycle is written to memory from the write queue and the value from I2 is written to the write queue. The values written to memory by I2, I3 is and I4 will remain in the write queue until the execution of additional instructions (not shown) free up time slots allowing them to be written to memory. For example, If a control instruction requiring neither READ nor WRITE were to be performed immediately after I4, the read stage of such instruction would allow another value to be written from the write queue, and no new value would be added thereto. Many control instructions, such as jump and dispatch instructions, require dispatch instructions, require neither READ nor WRITE. Many instructions do not require both READs and WRITEs from all memories. Because of such instructions, the average number of READs or WRITEs for each memory will drop below one operation per clock cycle.

In the preferred embodiment the write queue has a depth of four, although other queue lengths can be used. This is deemed sufficient to temporarily buffer the output values in most instances. If the queue should become full, a wait state can be generated to the central processor, and the write queue can write one value to the memory. It is preferred that a least recently used algorithm be chosen to determine which value is actually written to memory, so that the write queue actually operates as a queue. In the instance of multiple READs and WRITEs to the same address, that address will stay in the queue. Multiple WRITEs to the same address will not increase the number of values waiting in the queue.

Figure 4:
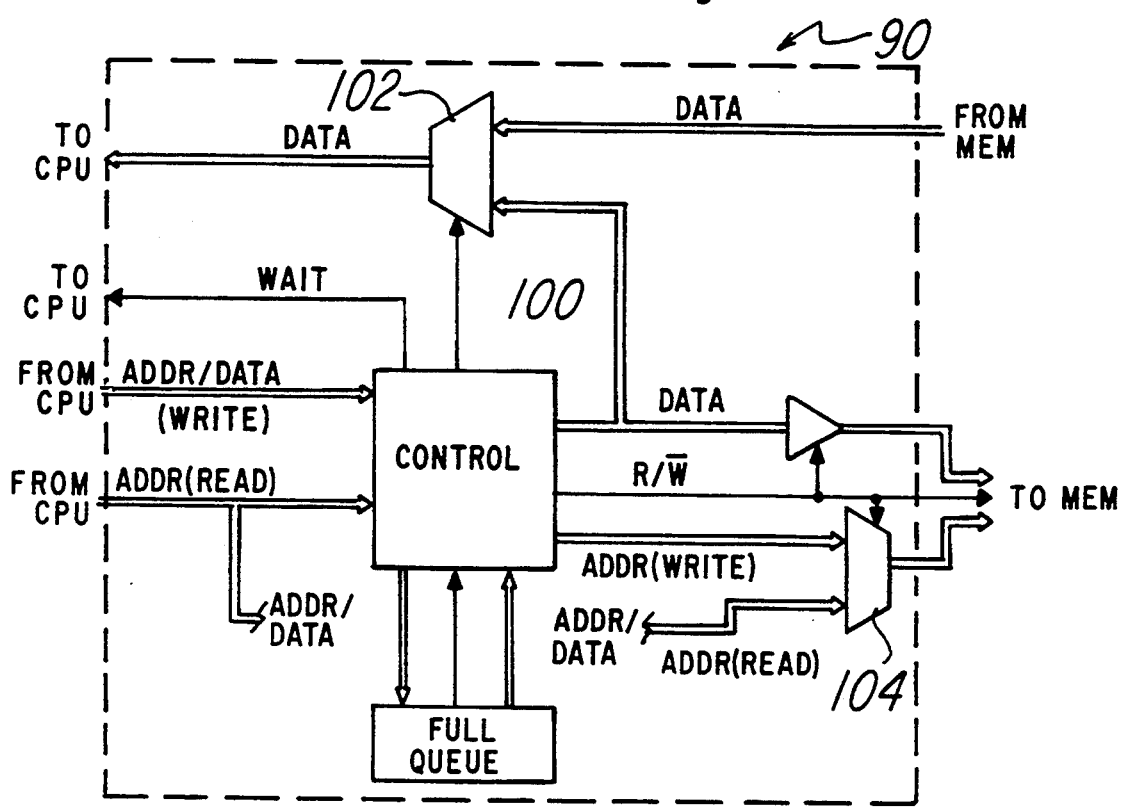
FIG. 4 is a block diagram of a write queue and associated control logic according to the present invention.

Referring to FIG. 4, a block diagram illustrating the relationship between one write queue and its associated control logic is shown. The write queue is dual ported having one port coupled to the CPU for receiving data and a second port coupled to both the CPU and the memory for writing data from the write queue. The QUEUE itself holds both address and data information, and is preferably four cells deep. When the QUEUE becomes full, a FULL signal is returned to the main CONTROL logic. When the CPU reads a memory location, the read address is applied to the CONTROL logic on read address lines (Addr/Read). If that address matches an address currently in the QUEUE, the value from the QUEUE will be selected by a control signal 100 applied to a multiplexer 102, rather than the outdated value being read from memory. If that address is not currently in the QUEUE, R/W is set to read, allowing the CPU to directly addres the memory through multiplexor 104.

When the CPU writes data to memory, both address and data are supplied to the CONTROL circuitry on lines Addr/Data (Write). If the address matches one of the addresses in the QUEUE, the QUEUE is updated with the new value. If the address does not match an address currently in the QUEUE, the new address and data are added to the QUEUE. If the QUEUE is non-empty, and the memory is avaliable during a clock cycle, the R/W signal is set to write from the QUEUE to memory during that cycle. In this case, multiplexor 104, is controlled by R/W, and the memory address is read from the QUEUE. The precise circuitry used to implement the control function can be designed by one skilled in the art to function with a given computer system, following the functions set forth above.

As described, the write queue is used with a microprocessor having 2 memories located on the CPU chip. It will be apparent that 1, or 3 or more memories can be used, each with its own write queue. The memories can be scratchpads, stacks, etc., and the use of a write queue is not dependant on the memory type. It is also possible to locate the memories on a separate chip or chips from the CPU.

TECHNICAL ADVANTAGES

The use of a write queue having a plurality of cells allows an instruction pipeline for a multiple-address instruction set computer to have read and write stages as separate clock cycles. The ALU is utilized up to 100%, and the clock rate may be doubled compared to previous pipeline architectures. The throughput of the machine is therefore greatly increased.

The present invention has been illustrated by the above description, and it will become apparent to those skilled in the art that various modifications and alterations may be made thereto. Such variations fall within the spirit of the present invention, the scope of which is defined by the appended claims.

I claim:

1. A pipeline computer architecture, comprising:
a central processor having an instruction set which includes instructions which perform read and write operations in a single instruction;
a memory coupled to said central processor, said memory containing data items to be read by said central processor, wherein said central processor is operable to write data to be placed in said memory;
buffer means having dual ports wherein one of said ports is coupled to said processor for receiving data and the other of said ports is coupled to said central processor and to said memory for writing data from said buffer means, wherein said buffer means holds a plurality of associatively accessible data items to be written to said memory until said memory is free to accept such data items, wherein said central processor is operable to read data items directly from said buffer means when a data item is to be read from said memory at a location which has a data item in said buffer means waiting to be written to such location; and
control circuitry operative to detect that an address to which a write is directed already exists in the buffer means, thereby not inserting additional data items into the buffer means when the data item for said address to which said write is directed already exists in the buffer means.

2. The computer architecture of claim 1, wherein said buffer means comprises a write queue containing a plurality of locations, an address comparator coupled to the write queue for determining whether an address to be read from said memory has a first data item contained in the write queue, selection means for causing a second data item stored in the write queue to be sent to said central processor when an address to be read has the second data item contained in the write queue, and signal means coupled to the write queue and to said central processor for indicating when the write queue is full.

3. A computer system, comprising:
a central processor;
an instruction memory coupled to said processor for holding instructions to be processed;
at least one data memory coupled to said processor;
a write queue having dual ports wherein one of said ports is coupled to said processor for receiving data and the other of said ports is coupled to said processor and to said data memory for writing data from said write queue, wherein said processor is operable to write to said write queue while data is being read from said data memory, and wherein information in said write queue is written to said data memory when data is not being read into said processor from said data memory;
wherein said write queue has a plurality of associatively accessible storage locations for containing data and address information, and control means for selectively transferring data and address information from said central processor to said write queue, from said write queue to said central processor, and from said write queue to said data memory, said control means further operative to obtain data from said write queue whenever said processor requests a data item waiting to be written from said write queue to said data memory, and wherein said control means comprises circuitry for detecting that an address to which a write is directed already exists in the write queue, thereby not inserting additional data items into the write queue when the data item for said address to which said write is directed already exists in the write queue.

4. The system of claim 3, wherein said processor comprises:
fetch means for fetching an instruction from said instruction memory;
read means for reading any necessary information from said data memory or from said write queue;
means for executing instruction; and
means for writing a result of any instruction to said write queue.

5. The system of claim 4, wherein each of the fetching, reading, executing and writing operations is one processor clock cycle in duration.

6. The system of claim 4, wherein a plurality of instructions are processed simultaneously, and wherein the fetching operation of an instruction is executed while the reading operation of the previous instruction is executing, and wherein each subsequent operation of an instruction is executed one stage later than the corresponding operation of the previous instruction.

7. A method for preventing bus conflicts in a computer system having a central processor connected to a memory by at least one bus, comprising the steps of:
(a) intercepting data and storing it in a buffer corresponding to said at least one bus, said buffer having dual ports, a first one of said ports coupled to said central processor and a second one of said ports coupled to said central processor and said memory, and a plurality of associatively accessible locations, whenever the central processor attempts to write data via said at least one bus to the memory;
(b) writing data from the corresponding buffer to the memory using said second one of said ports whenever said at least one bus is not otherwise busy; and
(c) transferring desired data items stored in the buffer corresponding to said at least one bus directly from the buffer to the central processor whenever the central processor attempts to read said data items from the memory via one of said at least one bus;
(d) detecting that an address to which a write is directed already is stored in the buffer; and (e) overwriting the buffer location corresponding to said address already stored in said buffer, whenever said write to the buffer is directed to said address already stored in the buffer.

8. The method of claim 7, wherein step (a) occurs only if said at least one bus is busy when the data write is attempted via that bus.

9. The method of claim 7, wherein the central processor executes instructions which read data form the memory and write data thereto in a single instruction.

* * * * *